(12) United States Patent
Boeger et al.

(10) Patent No.: US 7,784,604 B2
(45) Date of Patent: Aug. 31, 2010

(54) LINEAR VIBRATORY CONVEYOR

(75) Inventors: Christian Boeger, Regensburg (DE); Klaus Bott, Altdorf (DE); Franz Edbauer, Teublitz (DE)

(73) Assignee: Feintool Intellectual Property AG, Lyss (CH)

( * ) Notice: Subject to any disclaimer, the term of this patent is extended or adjusted under 35 U.S.C. 154(b) by 112 days.

(21) Appl. No.: 12/157,642

(22) Filed: Jun. 12, 2008

(65) Prior Publication Data

US 2009/0008221 A1    Jan. 8, 2009

(30) Foreign Application Priority Data

Jul. 6, 2007    (DE)    .................... 10 2007 031 640

(51) Int. Cl.
 *B65G 27/08* (2006.01)
(52) U.S. Cl. .................... 198/753; 198/766; 198/769; 198/770
(58) Field of Classification Search ........... 198/753, 198/766, 769, 770
 See application file for complete search history.

(56) References Cited

U.S. PATENT DOCUMENTS

| | | | | |
|---|---|---|---|---|
| 2,273,912 | A * | 2/1942 | Doyle ..................... | 318/127 |
| 3,786,912 | A | 1/1974 | Taylor | |
| 4,769,570 | A * | 9/1988 | Yokoyama et al. ........ | 310/332 |
| 4,795,025 | A * | 1/1989 | Doke et al. .............. | 198/763 |
| 4,862,030 | A * | 8/1989 | Yokoyama et al. ........ | 310/332 |
| 4,979,608 | A * | 12/1990 | Mikata et al. ............ | 198/566 |
| 5,285,890 | A * | 2/1994 | Stearns ................... | 198/766 |
| 5,462,155 | A * | 10/1995 | Demar et al. ............. | 198/760 |
| 5,777,232 | A * | 7/1998 | Kurita et al. .............. | 73/664 |
| 5,850,906 | A * | 12/1998 | Dean ..................... | 198/750.8 |
| 5,931,285 | A * | 8/1999 | Madsen et al. ........... | 198/762 |
| 6,064,138 | A * | 5/2000 | Iino et al. .............. | 310/316.01 |
| 6,105,753 | A * | 8/2000 | Graham .................. | 198/763 |
| 6,189,683 | B1 * | 2/2001 | Svejkovsky et al. ...... | 198/769 |
| 6,357,579 | B1 * | 3/2002 | Patterson et al. ......... | 198/766 |
| 6,588,581 | B1 * | 7/2003 | Evansic .................. | 198/760 |
| 6,782,992 | B2 * | 8/2004 | Mimura et al. ........... | 198/443 |
| 7,104,394 | B2 * | 9/2006 | Baird et al. .............. | 198/769 |
| 7,182,200 | B2 * | 2/2007 | Narukawa et al. ......... | 198/763 |
| 7,213,700 | B2 * | 5/2007 | Narukawa et al. ......... | 198/763 |
| 7,413,073 | B2 * | 8/2008 | Narukawa et al. ......... | 198/758 |

FOREIGN PATENT DOCUMENTS

| | | |
|---|---|---|
| DE | 2139018 | 2/1972 |
| DE | 41 42 280 | 6/1993 |
| DE | 10 2005 041 915 | 3/2007 |
| EP | 1 731 451 | 12/2006 |
| JP | 3-051210 | 3/1991 |
| JP | 3051210 | 3/1991 |

\* cited by examiner

*Primary Examiner*—Douglas A Hess
(74) *Attorney, Agent, or Firm*—Jordan and Hamburg LLP

(57) ABSTRACT

Vibratory linear conveyor that includes a utility weight and a counterweight that can be vibratingly moved in opposing directions via a drive unit, the drive unit being coupled to the utility weight and to the counterweight and being arranged in a receiving chamber beneath the utility weight, whereby a first drive unit including an electromagnet and a second drive unit including a piezo-electric actuator can be exchangeably installed for drive units, identical types of fastening arrangements being provided and positioned identically on each drive unit for connecting to the fastening arrangement arranged on the utility weight and on the counterweight.

6 Claims, 2 Drawing Sheets

LINEAR VIBRATORY CONVEYOR

BACKGROUND OF THE INVENTION

The invention relates to a linear vibratory conveyor that includes a utility weight and a counterweight that can be vibratingly moved in opposing directions via a drive unit, the drive unit being coupled to the utility weight and to the counterweight and being arranged in a receiving chamber beneath the utility weight.

Such linear vibratory conveyors transport small and very small articles or components that are to be supplied to a working or assembly machine where they are to be processed or installed. The linear vibratory conveyor linearly transports the parts, which are advanced via micro-jumps due to the vibrations generated in the transport rail and along which rail the components are moved. The structure of such a linear vibratory conveyor basically includes a base plate via which the conveyer can be attached to a machine table or the like, and a counterweight and a utility weight, which are both coupled via a drive unit and using the latter can be caused to vibrate in opposition to one another, which is why the utility weight and the counterweight are coupled, vibrationally movable, to the base plate via corresponding spring elements, usually leaf spring packets. In order to facilitate compact construction beneath the utility weight, which includes the transport rails, the drive unit is arranged in a receiving chamber disposed there between utility weight and base plate.

Generally an electromagnetic drive, that is, an electromagnet, is used for the drive unit. The magnet core is connected to the winding that surrounds it and to the counterweight, while the magnet armature is connected to the utility weight. By appropriately controlling the winding with a suitable alternating voltage, an alternating magnetic field that acts on the armature is created and produces the vibratory movement in a manner known per se.

However, also known is using a drive unit that includes a piezo-electric actuator that is arranged on a leaf spring of the conveyor that can be bent using the actuator. When an alternating voltage is applied, such a piezo-electric actuator undergoes a voltage-induced reversible change in shape that is transmitted to the spring element for generating vibration. Compared to using an electromagnet, vibrations with significantly higher frequencies can be generated with such a piezo-electric actuator. Thus for both drive units there are special application areas that require or justify the corresponding use of either the one or the other drive unit.

It is disadvantageous that the structural design of known linear vibratory conveyors that are provided for using electromagnets is different from that when using a piezo-electric actuator, especially with respect to coupling the drive unit to the utility weight and to the counterweight, so that different structural forms result as a function of drive unit. This consequently requires that different components be produced and maintained in inventory.

SUMMARY OF THE INVENTION

The underlying problem of the invention is therefore to provide a linear vibratory conveyor that is more flexible to employ and design.

For solving this problem, it is inventively provided in a linear vibratory conveyor of the type described in the foregoing that a first drive unit including an electromagnet and a second drive unit including a piezo-electric actuator can be exchangeably installed for drive units, identical types of fastening means being provided and positioned identically on each drive unit for connecting to the fastening means arranged on the utility weight and on the counterweight.

The invention provides a semi-hybrid linear conveyor system in which it is possible to selectively equip a linear vibratory conveyor either with an electromagnetic drive unit or with a piezo-electric drive unit, the basic structure of the linear vibratory conveyor always remaining the same. I.e., no structural changes must be undertaken on the base plate or utility weight or counterweight in order to be able to integrate either the electromagnetic drive unit or the piezo-electric drive unit. For this purpose the drive units are embodied such that they have fastening means that are identical in terms of type and position, i.e. in terms of the ability to connect to corresponding fastening means on the utility weight and the counterweight, the fastening means provided on each drive unit are each arranged at the same location and also match in terms of type. This makes it possible to connect the fastening means to corresponding fastening means on the weights, the corresponding fastening means having to be provided only once on each weight, because as described each of the drive units are inventively constructed identically.

The inventive linear vibratory conveyor or the hybrid conveyor system thus makes it possible to advantageously and selectively integrate different drive units rapidly and simply in terms of assembly, each proceeding from a basic linear vibratory conveyor structure that is always the same, that is, that is somewhat standardized. Thus with nothing further in terms of the employment purpose, the special advantages of each respective drive can be used by the simple integration thereof and with the concurrent simplicity of the conveyor structure in terms of the design of the utility weight and counterweight with respect to connecting the drives. Consequently it is not necessary to produce or keep in the inventory different types of conveyors that are designed with specific drives, but rather a single standardized linear vibratory conveyor is sufficient to be able to integrate the entire spectrum of different drives. The special advantage is also demonstrated for the user in the simple refitting, because if the present linear conveyor is to be used for a different purpose that requires a different drive, the user must merely exchange the drive unit.

The fastening means are preferably threaded bores into which can be screwed fastening screws that are to be guided through corresponding receiving passages on the respective opposing part. Either threaded bores are provided on the drive unit and receiving passages are provided on the weights or vice versa, "mixed systems" also being possible, of course, i.e. for attaching to the utility mass the utility mass is provided with receiving passages and the drive unit is provided with threaded bores, while for attaching to the counterweight the counterweight has the threaded bore while the drive unit has receiving passages. Ultimately the design here can be as desired, but overall it is useful for facilitating simple and rapid assembly and disassembly.

Additional advantages, feature, and details of the invention result from the exemplary embodiments described in the following and using the drawings.

DESCRIPTION OF THE PREFERRED EMBODIMENTS

Figure 1:
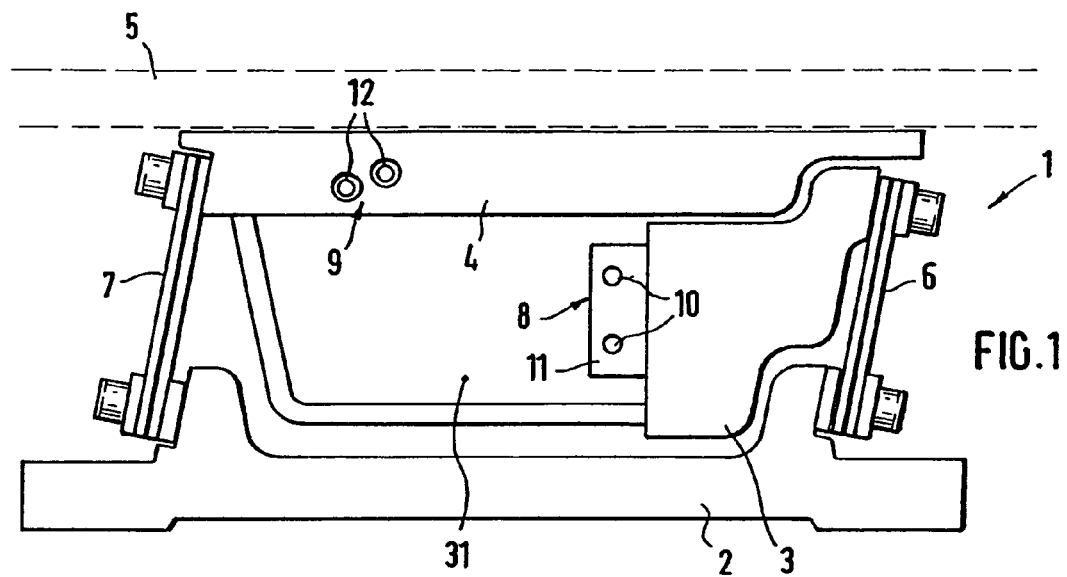
FIG. 1 depicts the principle for an inventive linear vibratory conveyor without inserted drive unit.

FIG. 1 depicts the principle for an inventive linear conveyor 1 including a base plate 2 via which the conveyor is to be connected to a third object, for instance a machine table or frame. Furthermore provided is a counterweight 3 and a utility weight 4 that is separate therefrom and that includes transport rails 5, shown here with broken lines. The counterweight 3 and the utility weight 4 are each connected at both ends to the base plate 2 via spring elements 6, 7, normally leaf spring packages, this making possible vibratingly movable bearing of the counterweight or utility weight 3, 4 relative to the base plate 2 and also to one another. In the figures, only front-most of two spring elements 6, 7 that are in this view one behind the other can be seen, of which one is connected to the counterweight (spring element 6) and the other is connected to the utility weight (spring element 7). The embodiment is such that the two spring elements 6, via which the counterweight 3 is connected to the base plate 2, are not arranged one behind the other as seen in the longitudinal direction of the linear conveyor 1, but rather are arranged offset to one another, and the same applies to the two spring elements 7 that couple the utility weight 4 to the base plate 2, again only one of which is visible in the figures, and these are also offset to one another. Overall a crossed spring element arrangement results, i.e. proceeding from the depiction in FIG. 1, the utility weight 4 is connected on its left end to the base plate 2 via a spring element 7 arranged on the right, and at the other end the spring element 7 is disposed on the left, while the counterweight is connected on its left end depicted in FIG. 1 to the base plate 2 via a spring element 6 arranged on the left and on its right end via the spring element 6 arranged on the right. To this end, the counterweight 3 and the utility weight 4 are appropriately embodied or their geometry is selected such that these fastening positions result. They have corresponding elements to which the spring elements are fastened. Furthermore, provided on the counterweight is a milled pocket 31 in which the drive unit is received, regardless of type.

Furthermore depicted are fastening means 8, 9 embodied on the counterweight 3 and on the utility weight 4, the fastening means 8 being threaded bores 10 that are provided in a projection 11 of the counterweight 3 that can be selected as desired in terms of geometry and size, while the fastening means 9 are embodied as passages 12. Fastening screws are received therein for fastening a corresponding drive unit, as shall be explained using the exemplary embodiments in FIGS. 2 and 3.

Figure 2:
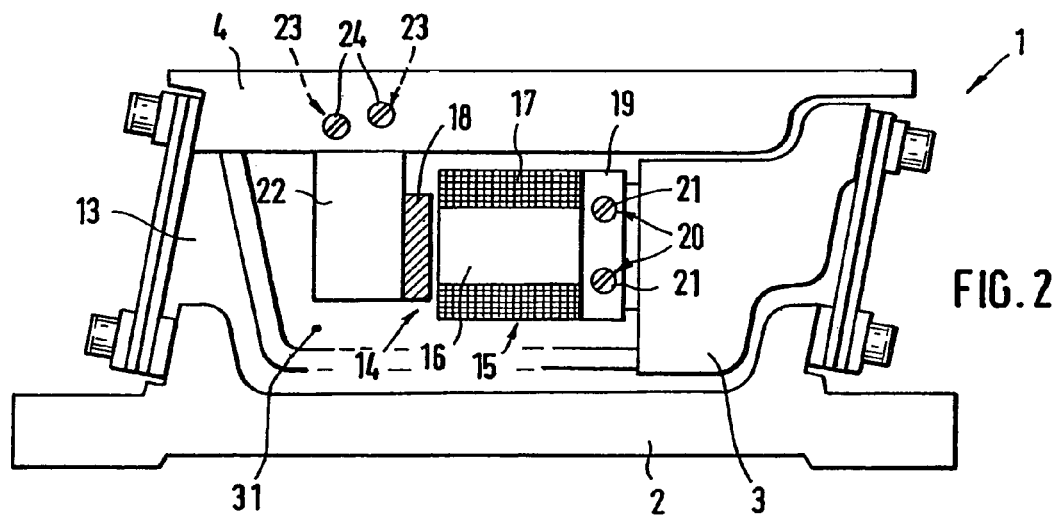
FIG. 2 depicts the principle for an inventive linear conveyor having an inserted electro-motor drive unit; and, FIG. 3 depicts the inventive linear conveyor having an inserted piezo-electric drive unit.

FIG. 2 depicts the inventive linear vibratory conveyor 1 (the transport rails not being depicted in greater detail here), a drive unit 14 that includes a vibrating motor 15 having a magnetic core 16 and a winding 17 surrounding the latter and an armature 18 spaced apart therefrom being arranged in the receiving chamber 13 between the utility weight 4 and the base plate 2. In addition to the winding 17, the magnetic core 16 has a fastening segment 19 on which are provided fastening means 20 in the form of appropriate passages through which fastening screws 21 are guided and are screwed into the threaded bores 10 of the utility weight 3.

The magnet armature 18 is arranged on an extension 22 that itself has fastening means 23 that are not visible here (broken arrows) that are embodied as threaded bores and into which fastening screws 24 are screwed that first pass through the passages 12. This is how the magnet armature 18 is connected to the utility weight 3. During operation, an appropriate alternating voltage is applied to the winding 17 so that an alternating magnetic field results that continuously attracts and repels the magnet armature 18, producing the opposing vibration of counterweight and utility weight.

Figure 3:
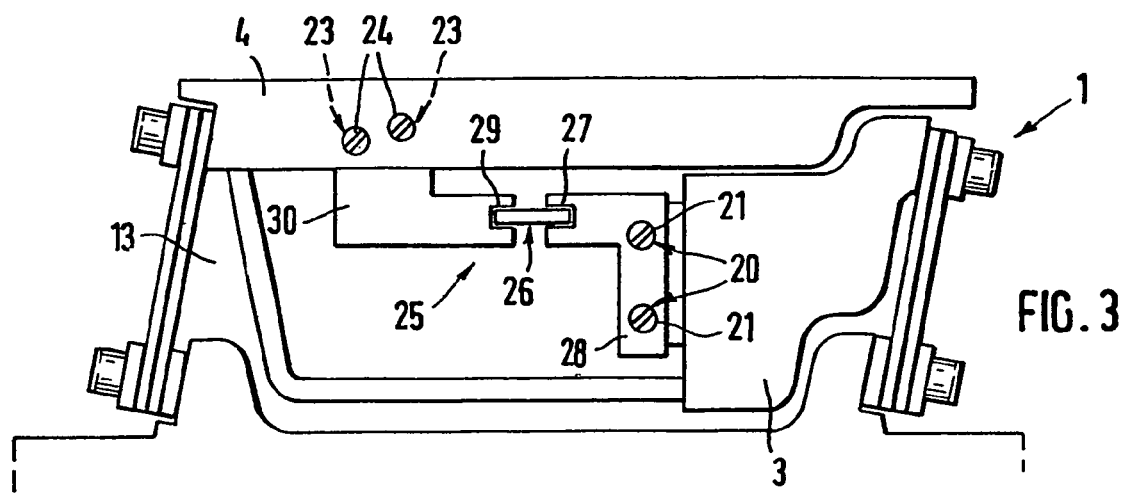

FIG. 3 depicts the linear conveyor 1 from FIG. 1, a piezo-electric drive unit 25 including a piezo-magnetic actuator 26 being integrated in the chamber 13 instead of the electromagnetic drive unit 14, however. The piezo-electric actuator, which is only sketched in here, is received at one end in a receiving element 27 of a fastening part 28 for connecting to the counterweight 3. In this case, as well, the fastening part 28 has fastening means 20 in the form of appropriate receiving passages into which corresponding fastening screws 21 are again inserted and are screwed into the threaded bores 10 of the utility weight 3. The position of the fastening means 20, that is of the drive unit receiving passages, corresponds exactly to the position of the fastening means, that is, the receiving passages 20 that are embodied on the electromagnet.

The other end of the piezo-electric actuator 26 is received in a suitable receiving element 29 of a fastening part 30 that is connected to the utility weight. Like the extension 22, this fastening part 30 also has corresponding fastening means 23 (not visible here, broken arrows) in the form of threaded bores into which in this case as well fastening screws 24 are screwed that first pass through the receiving passages 12 provided on the utility weight. In this case, as well, the position and type of fastening means 23 is exactly the same as the position and type of fastening means 23 on the electromagnet extension 22.

Thus, as can be seen, the identical position and type of arrangement and design for the fastening means on the different drive units 14 and 25 permit integration into the linear conveyor 1 that has been constructed in a standardized manner or that is provided with fastening means that are positioned and embodied in a standardized manner so that only one type of conveyor must be maintained in the inventory, and depending on the need an appropriate drive unit must be integrated using simple assembly.

The invention claimed is:

1. A vibratory linear conveyor comprising a base, a utility weight and a counterweight, said utility weight and counterweight comprising fastening means arranged thereon and being separately connected to the base and vibratingly movable in opposing directions relative to each other via a drive unit, said drive unit being connected to said utility weight and to said counterweight and being arranged in a receiving chamber beneath said utility weight, said drive unit including an electromagnet or a piezo-electric actuator, and being exchangeably installable as said drive unit and comprising identical types of fastening means being provided and positioned identically on each drive unit for enabling connection to the fastening means arranged on said utility weight and on said counterweight.

2. The vibratory linear conveyor in accordance with claim 1, wherein said drive unit fastening means are threaded bores and said utility weight fastening means and counterweight fastening means are receiving passages for receiving fastening screws or vice versa.

3. A vibratory linear conveyor, comprising:
   a base plate;
   a utility weight;
   a counterweight; and
   a drive unit beneath said utility weight, and comprising fastening means connecting said utility weight and said counterweight with said drive unit, said drive unit providing vibrational movement of said utility weight and said counterweight in opposing directions, said utility weight and said counterweight each being separately and directly connected to said base plate and each comprising fastening means being matingly engageable with said drive unit fastening means, said engageability allowing exchangeability of said drive unit with each of said utility weight and said counterweight.

4. The vibratory linear conveyor in accordance with claim 3, wherein:

said drive unit fastening means are threaded bores and said utility weight fastening means and counterweight fastening means are receiving passages for receiving fastening screws or vice versa.

5. The vibratory linear conveyor in accordance with claim 4, wherein:

said drive unit comprises an electromagnet.

6. The vibratory linear conveyor in accordance with claim 4, wherein:

said drive unit comprises a piezo-electric actuator.

* * * * *